United States Patent [19]

Haak et al.

[11] Patent Number: 5,386,363

[45] Date of Patent: Jan. 31, 1995

[54] AIRCRAFT LOAD MANAGEMENT CENTER

[75] Inventors: David A. Haak, Rockford, Ill.; William R. Owens, Waukesha, Wis.; Thomas D. Roettger, Rockford, Ill.

[73] Assignee: Sundstrand Corporation, Rockford, Ill.

[21] Appl. No.: 37,186

[22] Filed: Mar. 25, 1993

Related U.S. Application Data

[63] Continuation of Ser. No. 570,118, Aug. 16, 1990, abandoned.

[51] Int. Cl.6 .................. H02J 13/00; G06F 15/56
[52] U.S. Cl. ................. 364/424.01; 364/492; 395/750
[58] Field of Search ............ 364/424.01, 424.05, 364/424.06, 492, 131–133, 137–139; 395/725, 750; 340/825.06, 825.07, 825.52, 825.53; 307/9.1, 43, 64, 65, 85, 86; 371/8.1, 9.1, 11.1

[56] References Cited

U.S. PATENT DOCUMENTS

| | | | |
|---|---|---|---|
| 3,522,588 | 8/1970 | Clarke et al. | 364/138 X |
| 3,626,385 | 12/1971 | Bouman | 364/138 X |
| 3,760,169 | 9/1973 | Paculat | 364/138 X |
| 3,842,249 | 10/1974 | Geyer et al. | 364/492 |
| 4,064,485 | 12/1977 | Leyde | 364/492 X |
| 4,213,182 | 7/1980 | Eichelberger et al. | 364/493 |
| 4,393,498 | 7/1983 | Jackson et al. | 371/29.1 |
| 4,663,539 | 5/1987 | Sharp et al. | 364/492 X |
| 4,682,294 | 7/1987 | Duc et al. | 364/492 |
| 4,698,517 | 10/1987 | Tohya et al. | 364/492 X |
| 4,740,882 | 4/1988 | Miller | 364/138 X |
| 4,777,607 | 10/1988 | Maury et al. | 364/492 |
| 4,943,919 | 7/1990 | Aslin et al. | 364/424.01 X |

OTHER PUBLICATIONS

"Airborne Display and Electric Management System," Eckenfelder et al., Westcon Proceedings, Aug. 1970.
"Automatic Control of Aircraft Electrical System Reduces Wiring and Improves Reliability," Geyer et al., Westinghouse Engineer, Jul. 1971.

Primary Examiner—Vincent N. Trans
Attorney, Agent, or Firm—Jeffery J. Makeever

[57] ABSTRACT

In an aircraft load management center each LRU is addressed by a separate line. Power control units on an LRU are addressed by a bus to which all the LRUs are connected in parallel. Control and status inputs, and status output lines are connected in parallel to the LRUs. A programmable logic unit on each LRU decodes the controller addresses, couples control and status request inputs to the controller. The load management center automatically connects a status signal to the interface output after each control function input.

5 Claims, 3 Drawing Sheets

AIRCRAFT LOAD MANAGEMENT CENTER

This is a continuation of U.S. patent application Ser. No. 07/570,118 filed on Aug. 16, 1990, now abandoned.

BACKGROUND OF THE INVENTION

1. Field of the Invention

The present invention generally relates to an improved aircraft load management center, and more particularly to a fast acting, hardware efficient load management center with multiple line replacement units.

2. Description of the Prior Art

Power systems in aircraft today are commonly controlled by digital data generated by on board computers in response to manually operated switches and other inputs from various transducers. Advantageously, power switching is accomplished at one or more load management centers which connect and disconnect the various loads to the appropriate power bus by means of solid state controllers. A load management center contemplated by this invention includes a number of printed circuit boards each carrying a number of solid state controllers. In the event of a malfunction of a controller or other malfunction, the load center design is such that the board which carries the malfunctioning unit can be unplugged and replaced with a properly operating board of the same type. That is, each of the boards is what is known in the aircraft power-control art as a line replaceable unit (LRU).

Data must be transmitted between the load management center and the computer rapidly. The transmission must be fault tolerant. The load management center should automatically report controller status after each control command. All this must be accomplished efficiently in terms of hardware costs, weight, and high-speed data throughput.

Prior art suggestions for aircraft load management centers include U.S. Pat. No. 3,842,249 ELECTRICAL SYSTEM WITH PROGRAMMED COMPUTER CONTROL AND MANUALLY INITIATED CONTROL MEANS. This patent discloses an automatically controlled electrical system controlling a plurality of loads in the functions of load resetting, logical control, load sequencing, overload evaluation, and load shedding with single point control. A data entry and display means provides a manual interface with the system. The system utilizes remotely controlled power switching and circuit protective devices. A general purpose computer is used to effect control functions by multiplexed control signals. The computer directs the control signals to and from the appropriate switching devices and it also provides capability to program for automatic control, sequencing and self-checkout functions.

A Westinghouse Engineer article entitled "Automatic Control of Aircraft Electrical System Reduces Wiring and Improves Reliability", discloses a distribution system which combines remote load control and indication, signal multiplexing, and programmable control logic.

A Westcon Proceedings article entitled "Airborne Display and Electric Management System", discloses a multiplexed load management center with power control and fault sensing.

These prior art approaches do not provide an implementation which is altogether satisfactory for a load management center which employs multiple line replaceable units, each carrying a number of controllers.

SUMMARY OF THE INVENTION

It is therefore an object of this invention to provide an aircraft load management center which provides high-speed data throughput, is efficient in terms of hardware cost and weight and operates with multiple device line replacement units.

Briefly, this invention contemplates the provision of an aircraft load management center in which each LRU is addressed by a separate line and the power controllers on an LRU are addressed by a data bus to which all the LRUs are connected in parallel. Control and status input, and status output lines are connected in parallel to the LRUs. A programmable logic unit on each LRU decodes the controller addresses, and couples control and status request inputs to the controller. The load management center automatically connects a status signal to the interface output after each control function input.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
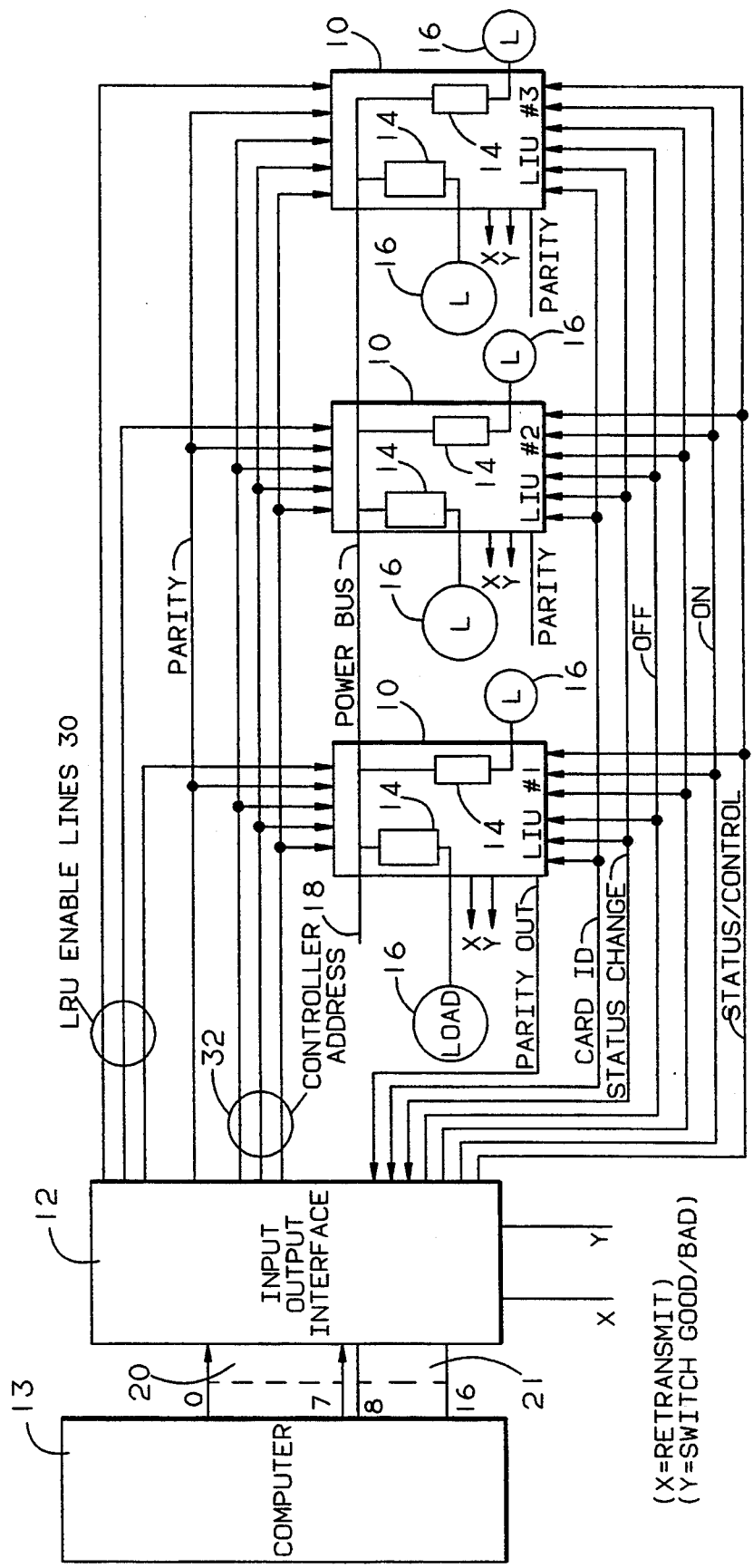
FIG. 1 is a block diagram of one embodiment of a load management center in accordance with the teachings of this invention.

Referring now to FIG. 1, a load management center in accordance with the teachings of this invention has a number of LRUs 10 and an input-output interface 12 which receives control and status commands from a computer 13 as a parallel word on input data lines 20. Each input word specifies a LRU address, a particular control unit or the LRU and an operational code; e.g. on/off control commands, and status commands. The interface 12 transmits control unit status signals over output data lines 22.

The load management center has a number of line replacement units (LRUs) 10 labeled in the drawing as LRU #1, LRU #2 and LRU #N. Each of the LRUs comprises a printed circuit board which has coupled to it a number of solid state controllers 14. The controllers 14 connect loads 16 to a power bus 18. It will be appreciated that in a typical load management center different loads may be connected to different buses. However, here only a single bus is shown for the sake of the clarity of the drawing.

One of a group of lines 30 is dedicated to each LRU and an input-output interface 12 to each LRU in order to address and enable a particular LRU. A three-line bus 32 connected in parallel to all the LRUs is used to address a particular controller 14 on a LRU which has to be enabled by one of the lines 30. The three-line bus 32 in this specific embodiment provides a three-bit address code which can address up to 8 controllers 14 on an LRU.

The computer generated address has a component which specifies one of the LRUs and a component which specifies a particular control unit on the LRU. The I/O interface decodes the LRU address and generates an enabling signal on one of the lines 30, enabling the appropriate LRU. The bus 32 couples the address of the particular control unit 14 to all LRUs but the bus 32 signals are used only by the enabled LRU. The operation code portion of the character transmitted from CPU specifies whether it is a status or control function and if a control function, on or off. The character also contains a parity bit.

The I/O interface 12 transmits status and other information from the load management center to the computer. The status information includes: status on; status off; and status change. Status signals are generated and transmitted automatically after each control command and also in response to status command from the computer. The I/O interface transmits: a retransmit signal after each failed attempt to control or read the status of a control unit 14; a Device Good/Bad signal indicating whether or not an addressed device is operable; a hard type identified signal; and a parity signal.

Figure 2:
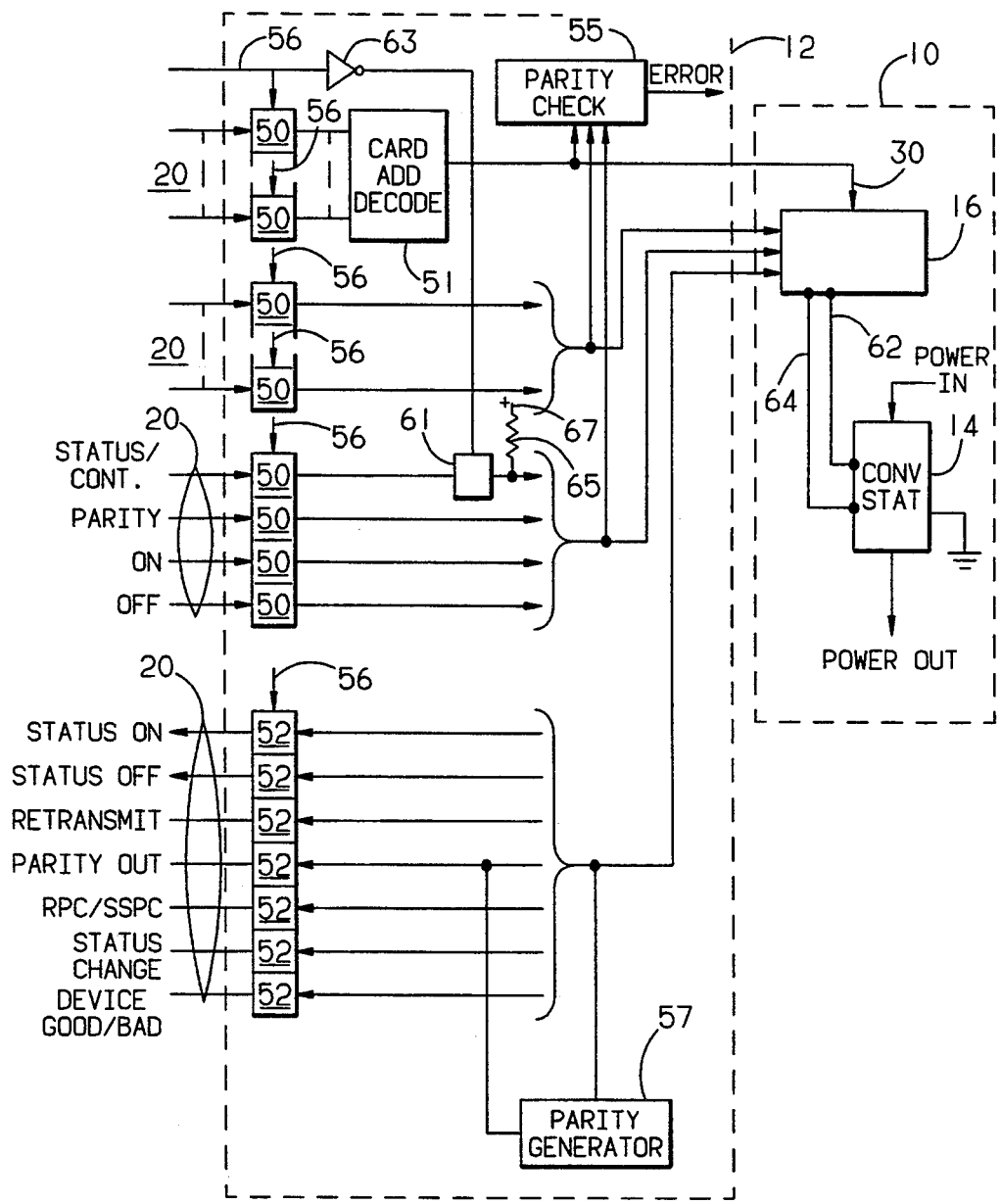
FIG. 2 is a schematic diagram illustrating certain logical functions performed in the system shown in FIG. 1.
Figure 3:
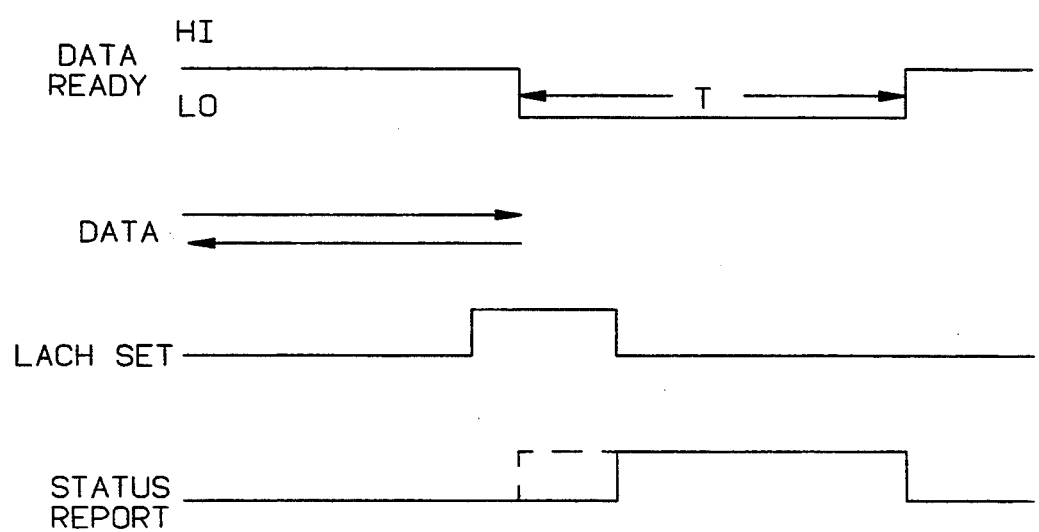
FIG. 3 is a timing diagram for certain of the operations in FIG. 2.

Referring now to FIGS. 2 and 3 in addition to FIG. 1, the I/O interface 12 of the load management center has a series of latches 50 for receiving and storing signals from the computer over input lines 20, and a series of latches 52 which receive and store signals from the load management center for transmission to the computer over output lines 21. As illustrated in FIG. 3, a pulse, labeled LATCH SET, generated by the computer and transmitted on line 56 sets latches 50 and 52 to the states to which they had been driven by their respective DATA IN lines during the interval when a computer generated DATA READY line is logically high. Once the latches are set, the computer is free of the task of maintaining inputs to these lines. After a short interval (e.g., 15 nanoseconds) the computer drops the DATA READY line for a fixed interval "T" (e.g., 10-20 microseconds) which is sufficient in duration to allow transmission to LRU of the latched data, execution of a control function, and a report back of control unit status.

Each LRU has a programmable logic unit 60. The inputs to the logic unit 60 are one of the LRU address lines 30, the control unit address bus 32, and the control and status inputs from latches 50. Here it should be noted that the I/O interface 12 includes a decoder 51 to decode the LRU address to a logic level signal on a assigned one of the lines 30. A control line 62 and a status line 64, respectively, couple each of the control units 14 on a LRU to a logic unit 60 on that card. The logic unit 60 also couples the status information from the control unit 14 to the output latches 52.

An odd or even parity may be used. On the input side, a parity detector 55 coupled to the leads detects input errors. A parity generator 57 generates a parity signal to enable the computer to detect errors in the transmitted signal. Each detected error generates a retransmit signal in response to which the computer will retransmit the original input character. The output of the status/control latch 50 is coupled to one input of a buffer gate 61. The strobe line 56 is coupled to the other input of buffer gate 61 via level inverting gate 63. The output of gate 61 is coupled to a logically high potential 67 via resistor 65. Buffer gate 61 is enabled when the strobe pulse on line 56 is logically high (output of gate 63 is logically low). When the strobe is low (output of gate 63 high) the gate 61 is disabled and floats. Resistor 65 pulls the output of gate 61 to the logically high potential of source 67. This high level is a status request signal.

In operation, the computer 13 transmits a character to the load management center any time the DATA READY line is logically high. The LATCH DATA pulse on line 56 transmitted from the computer 13 stores the data in latches 50. The decoder 51 decodes the LRU address and places one of the lines 30 in for example, a logical high state, enabling the logic unit 60 to which the line 30 is connected. The enabled logic unit decodes the address of the particular control unit 14 and connects the control input of the addressed controller to the "on" and "off" input lines if the control/status line indicates a control function. If the control/status line indicates a status function, the logic unit connects the status output of the controller to the status output lines. Following a control function, the load management center automatically generates status request (STATUS REPORT—FIG. 3) prior to the end of interval T. Specifically, source 67 and resistor 65 pull the output of gate 61 to a logically high "status request" state after the strobe pulse terminates. Logic unit 60 receives the status request and connects the status output of the controller to status output lines. As previously mentioned, this cycle is completed within a interval T, and following this interval the DATA READY line goes high. The computer reads the state of latches 52 shortly following the termination of T.

While the invention has been described in terms of a single preferred embodiment, those skilled in the art will recognize that the invention can be practiced with modification within the spirit and scope of the appended claims.

Having thus described my invention, what we claim as new and desire to secure by Letters Patent is as follows:

1. A load management center for on-board control of aircraft electrical power, comprising in combination:

a plurality of line replaceable units, each of said line replaceable units including a printed wiring board to which a programmable logic unit and a plurality of power control units are electrically and mechanically coupled, each of said power control units having a control input and a status output means;

an input/output interface for temporarily storing inputs from a computer to the load management center and outputs from the load management center to the computer, said inputs including a line replaceable unit address, a power control unit address, and an operation code, and said outputs including a status code;

decoding means to decode said line replacement unit address;

a dedicated line coupling said decoding means respectively to one of each of said programmable logic units, said decoding means enabling said programmable logic unit to which it is attached in response to a line replaceable unit address;

a bus coupled in parallel to said programmable logic unit electrically and mechanically coupled to each of said plurality of line replaceable units for coupling between said programmable logic unit and said interface, power control unit address, operational code and status code;

a parity detector coupled to said bus, said parity detector generating a retransmit signal on said outputs in response to a parity error on said bus; and wherein the computer retransmits said inputs in response to said retransmit signal on said outputs.

2. The load management center of claim 1, wherein said outputs further include a device good/bad signal indicating the operational status of a selected control unit.

3. A load management center for on-board control of aircraft electrical power, comprising in combination:

a plurality of line replaceable units, each of said line replaceable units including a printed wiring board to which a programmable logic unit and a plurality of power control units are electrically and mechanically coupled, each of said power control units having a control input means and a status output means;

an input/output interlace for temporarily storing inputs from a computer to the load management center to the computer, said inputs including a line replaceable unit address, a power control unit address, a control request code and a status request code, and said output including a status output code;

decoding means to decode said line replaceable unit address;

a dedicated line coupling said decoding means respectively to one of each of said programmable logic units, said decoding means enabling said programmable logic unit to which it is attached in response to a line replaceable unit address;

a bus coupled in parallel to said programmable logic unit electrically and mechanically coupled to each of said plurality of line replaceable units for coupling between said programmable logic unit and said interface, power control unit address, operational code and status code;

means to automatically generate said status request code following a control request code;

a parity detector coupled to said bus, said parity detector generating a retransmit signal on said, outputs in response to a parity error on said bus; and wherein the computer retransmits said inputs in response to said retransmit signal on said outputs.

4. A load management center for on board control of aircraft electrical power as in claim 3, wherein said input/output interface includes said means to automatically generate said status request code.

5. The load management center of claim 4, wherein said outputs further include a device good/bad signal indicating the operational status of a selected control unit.

* * * * *